United States Patent [19]

Koo

[11] 3,849,673

[45] Nov. 19, 1974

[54] COMPENSATED IGFET FLIP-FLOP AMPLIFIERS

[75] Inventor: James Teh-Zen Koo, Wescosville, Pa.

[73] Assignee: Bell Telephone Laboratories, Incorporated, Murray Hill, N.J.

[22] Filed: Nov. 9, 1973

[21] Appl. No.: 414,193

[52] U.S. Cl............... 307/235 R, 307/279, 307/304
[51] Int. Cl...... H03k 5/20, H03k 3/286, H03k 3/33
[58] Field of Search......... 307/235 R, 238, 279, 304

[56] References Cited

UNITED STATES PATENTS

| | | | |
|---|---|---|---|
| 3,514,765 | 5/1970 | Christensen | 307/279 X |
| 3,588,844 | 6/1971 | Christensen | 307/279 X |
| 3,610,965 | 10/1971 | Martin et al. | 307/279 |
| 3,657,570 | 4/1972 | Brink | 307/279 |
| 3,668,438 | 6/1972 | Cheney | 307/279 |
| 3,760,194 | 9/1973 | Lutz et al. | 307/235 R |
| 3,767,945 | 10/1973 | Goser | 307/279 |

FOREIGN PATENTS OR APPLICATIONS

| | | | |
|---|---|---|---|
| 1,514,421 | 8/1969 | Germany | 307/279 |

OTHER PUBLICATIONS

Critchlow, "Sense Amplifier for IGFET, Memory;" IBM Tech. Discl. Bull.; Vol. 13, No. 6, pp. 1720–1722, Nov. 1970.

*Primary Examiner*—Rudolph V. Rolinec
*Assistant Examiner*—L. N. Anagnos
*Attorney, Agent, or Firm*—S. Sherman

[57] ABSTRACT

Differences in the parameters of IGFET's, which tend to limit the sensitivity of differential signal, flip-flop amplifiers using IGFETs, are minimized. In a first embodiment of the invention, the difference in the threshold voltages of the transistors is minimized by precharging the drain electrodes of the cross-coupled IGFETs to the threshold voltage of the respective transistors. In a second embodiment, all parameter differences are minimized. In this second embodiment capacitive cross-coupling is employed. During a preconditioning period, stable, though unequal operating conditions are established in the cross-coupled IGFETs. These conditions are maintained in a second, sensing period during which the slightest inequality in the input signals applied to the amplifier causes one of the transistors to turn off.

4 Claims, 4 Drawing Figures

COMPENSATED IGFET FLIP-FLOP AMPLIFIERS

This invention relates to differential signal amplifiers using insulated gate field effect transistors (IGFET's) and, in particular, to means for compensating for threshold voltage and other parameter differences in such devices.

BACKGROUND OF THE INVENTION

The use of field effect transistors, arranged in a flip-flop circuit configuration, to detect and amplify small signals is well-known in the art. The difficulty with such prior art circuits resides in the fact that their mode of operation presupposes that the cross-coupled FET devices have identical parameters. As a practical matter, however, such devices typically have very different threshold voltages and transconductances. Indeed, in many cases these differences are sufficient to render prior art circuits inoperative for their intended purposes. In general, reliable operation of prior art circuits requires that the FET devices be carefully matched.

Accordingly, it is the broad object of the present invention to compensate for the parameter differences in FET devices.

SUMMARY OF THE INVENTION

In a first embodiment of a flip-flop differential signal amplifier in accordance with the present invention, the drain electrode of each of the cross-coupled FETs is precharging, during a first time period, to the threshold voltage for that transistor. The effect of this is to eliminate any threshold voltage difference between the two FET's when the differential amplifier is activated during a second time period in which the signal to be detected is impressed upon the amplifier.

Whereas in the prior art the minimum differential input signal that could be detected and amplified is equal to the difference in the threshold voltages of the two FET's, it is an advantage of the first embodiment of the present invention that the minimum input signal that can be detected is independent of the transistors' threshold voltages.

In addition to threshold voltage differences, there are other parameter differences which affect the operation of flip-flop circuits using IGFETs. The deleterious effects of all parameter differences are minimized in a second embodiment of the invention wherein capacitive cross-coupling is employed. During a preconditioning period, a stable current is established in each of the two transistors making up the flip-flop amplifier. In general, these currents will be unequal. Means are also provided for short circuiting the gate electrode to the drain electrode of each of the transistors, thus establishing for each transistor substantially zero potential difference between the gate and drain electrodes.

At the conclusion of the preconditioning period, and with the above-described steady state conditions established, the gate-drain short circuit is removed, thereby initiating the sensing period. The removal of the short circuit disturbs neither the current nor voltage conditions previously established, and the amplifier remains in a metastable condition. This condition can be upset by the application of unequal signals at the amplifier input ports which results in turning one of the two transistors off.

It is an advantage of this second embodiment of the invention that through different operating conditions are established in the two transistors, the circuit responds solely to differences in the magnitude of the applied input signals.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
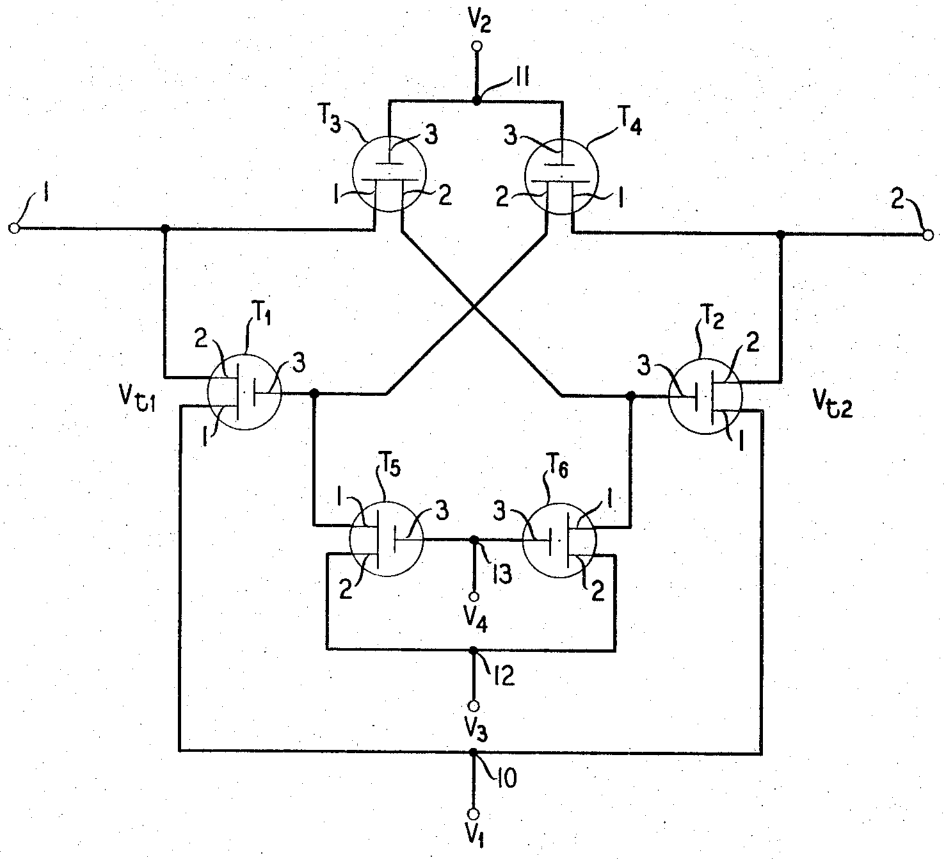
FIG. 1 shows a flip-flop amplifier in accordance with a first embodiment of the invention.

Referring to the drawings, FIG. 1 shows a threshold voltage compensated flip-flop circuit in accordance with a first embodiment of the present invention. The circuit includes six IGFET's. Of these, the two cross-coupled transistors $T_1$ and $T_2$ make up the standard FET flip-flop. Specifically, the drain electrode 2 of each of the transistors $T_1$ and $T_2$ is connected, respectively, to input signal ports 1 and 2. The source electrodes 1 of transistors $T_1$ and $T_2$ are connected to a common junction 10 and a common voltage source $V_1$.

The gate electrode 3 of transistor $T_1$ is cross-coupled to the drain electrode 2 of transistor $T_2$ through the source-drain circuit comprising electrodes 2 and 1 of transistor $T_4$. Similarly, the gate electrode 3 of transistor $T_2$ is cross-coupled to the drain electrode 2 of transistor $T_1$ through the source-drain circuit comprising electrodes 2 and 1 of transistor $T_3$. The gate electrodes 3 of transistors $T_3$ and $T_4$ are connected to a common junction 11 and a common voltage source $V_2$.

Gate electrodes 3 of transistors $T_1$ and $T_2$ are coupled to a common junction 12 and a common voltage source $V_3$ by way of electrodes 2 and 1 of transistors $T_5$ and $T_6$, respectively. The gate electrodes 3 of transistors $T_5$ and $T_6$ are connected to a common junction 13 and a common voltage source $V_4$.

For purposes of explanation, the transistors are assumed to be *p*-channel enhancement FETs. Obviously, they can just as readily be *n*-channel enhancement FET's.

Figure 2:
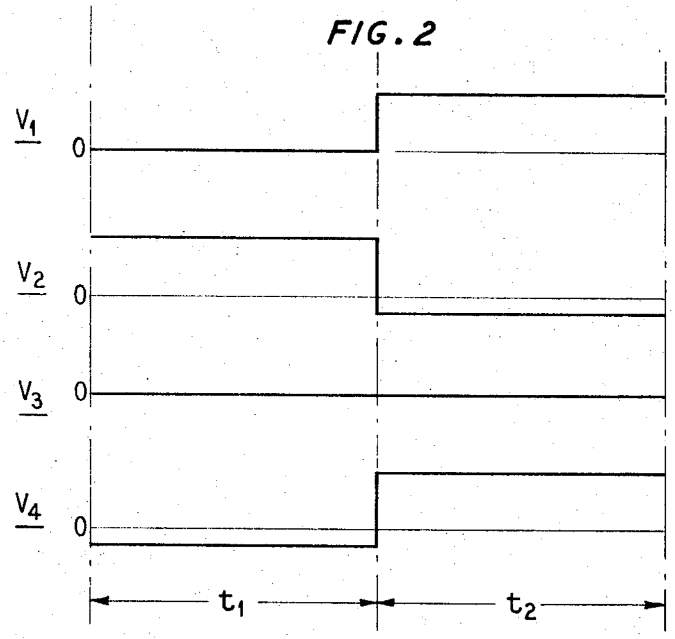
FIG. 2, included for purposes of explanation, shows the voltage variations of the several voltage sources applied to the amplifier of FIG. 1.

The operation of the above-described circuit is best understood by referring to FIG. 2 which shows the voltage variations of the several voltage sources over one operational cycle. It will be recognized, however, that the particular voltage magnitudes referred to in the following explanation are merely illustrative, and that other combination of voltages can just as readily be used.

It will first be noted that the operational cycle is divided into two time periods of duration $t_1$ and $t_2$. During the first period $t_1$, electrode 2 of each of the transistors $T_1$ and $T_2$ is precharged to its own threshold voltage. In particular, during time interval $t_1$, $V_1$ and $V_3$ are at zero voltage. $V_4$ is at a negative voltage. The latter is sufficiently large such that it exceeds the threshold voltages of transistors $T_5$ and $T_6$, thereby turning these transistors on. This tends to lower the gate voltages of transistors $T_1$ and $T_2$ to $V_3$ which, in this case, is zero.

Conversely, $V_2$ is at a sufficiently large positive potential to turn off transistors $T_3$ and $T_4$, thus effectively open-circuiting the cross-coupling connections between transistors $T_1$ and $T_2$.

With zero voltage on both the gate and the source electrodes of transistors $T_1$ and $T_2$, the potential on the drain electrodes drops to the threshold voltage for the respective transistors, i.e., $V_{t1}$ for transistor $T_1$, and $V_{t2}$ for transistor $T_2$. Thus, at the end of the first time period, the gate and the source electrodes of transistors $T_1$ and $T_2$ are at zero potential, while the drain electrode of each transistor has been precharged to its threshold voltage.

During the second time period, $V_4$ is increased to a sufficiently large positive potential to turn off transistors $T_5$ and $T_6$. Simultaneously, $V_2$ is increased to a sufficiently large negative voltage to turn on transistors $T_3$ and $T_4$, thereby coupling gate electrode 3 of transistor $T_1$ to electrode 2 of transistor $T_2$, and gate electrode 3 of transistor $T_2$ to the electrode 2 of transistor $T_1$. This, in turn, impresses the threshold voltage $V_{t2}$ on the gate electrode of transistor $T_1$, and the threshold voltage $V_{t1}$ on the gate electrode of transistor $T_2$.

As is known, the current I that flows through an FET is a function of the source-gate voltage minus the threshold voltage. For transistor $T_1$, the source-gate voltage is $V_1$–$V_{t2}$, and the threshold voltage is $V_{t1}$, so that $$I_1 = f(V_1 - V_{t2} - V_{t1}) \tag{1}$$

or $$I_1 = f[V_1 - (V_{t1} + V_{t2})] \tag{2}$$

For transistor $T_2$, the source-gate voltage is $V_1$–$V_{t1}$, and the threshold voltage is $V_{t2}$, so that the current $I_2$ is given by $$I_2 = f[V_1 - (v_{t1} + v_{t2})] \tag{3}$$

As will be noted, currents $I_1$ and $I_2$, as given by Equations (2) and (3), are equal. Thus, by precharging electrodes 2 of each transistor to a voltage equal to the threshold voltage of that transistor during a first time period, and then coupling that voltage to the gate electrode of the other transistor when the amplifier is activated during a second time period, the effect of any threshold voltage difference between the two transistors is completely eliminated.

In the above discussion, no reference was made to any signal voltages. Clearly, signal voltages would be simultaneously applied to amplifier input ports 1 and 2 during the second time period. Because of the above-described current balance between the two stages, the slightest difference in the magnitude of the two input signals will cause one of the transistors to draw current more heavily than the other. For example, let us assume a positive input signal voltage is applied to port 2, and that this signal is larger than the signal applied to input port 1. This will cause a decrease in the current in transistor $T_1$ relative to that in transistor $T_2$. The larger current flowing in transistor $T_2$ will, in turn, cause the drain electrode potential of transistor $T_2$ to increase at a faster rate than the drain electrode voltage of transitor $T_1$. This increased drain potential of transistor $T_2$ is coupled back to the gate of transistor $T_1$, and further decreases the current in that transistor. Thus, the initial imbalance produced by the unequal input signals is cumulative, until ultimately transistor $T_1$ is turned off and only transistor $T_2$ is conducting.

In the discussion hereinabove, the resulting currents $I_1$ and $I_2$, given by Equations (2) and (3), were shown to be functions of the same voltages and, as such, were characterized as being equal. Implicit in that characterization is the assumption that the functions which characterize the two transistors are themselves equal. Indeed, for this to be so would require that all the significant parameters of the two transistors are either equal, or only negligibly different. Among these parameters is the transconductance $\beta$ of the transistors. If, in fact, the difference in the transconductance of the two transistors is sufficiently small, and it typically is smaller than the difference in the threshold voltages, the circuit of FIG. 1 may be adequate to provide sufficiently reliable performance. If, however, it is not sufficiently small, means are advantageously employed to eliminate the effect of such differences. One means for eliminating all differences between transistors will now be described in connection with FIGS. 3 and 4.

Figure 3:
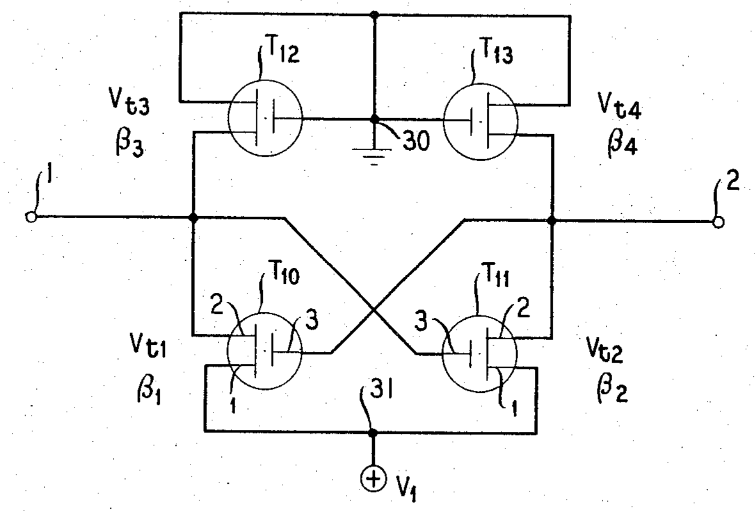
FIG. 3 (PRIOR ART)
FIG. 3 shows, a prior art flip-flop amplifier.

FIG. 3, now to be described, illustrates a typical prior art flip-flop comprising a pair of cross-coupled transistors $T_{10}$ and $T_{11}$. The drain electrodes 2 of these transistors are coupled to a common junction 30 by means of the souce-drain circuits of a second pair of transistors $T_{12}$ and $T_{13}$. For purposes of illustration, junction 30 is shown connected to ground. Also connected to junction 30 are the gate electrodes of transistors $T_{12}$ and $T_{13}$. The source electrodes of transistors $T_{10}$ and $T_{11}$ are connected to a second common junction 31 which, for purposes of illustration, is connected to a positive potential $V_1$.

If transistors $T_{10}$ and $T_{11}$ were identical, and transistors $T_{12}$ and $T_{13}$ were identical, the current through transistors $T_{10}$ and $T_{12}$, and the current through transistors $T_{11}$ and $T_{13}$ would be equal, and both halves of the circuit would be perfectly balanced with no tendency for either of these currents to increase or decrease. In this balanced condition, the slightest differential signal applied between input ports 1 and 2 will turn one or the other of the transistors $T_{10}$ or $T_{11}$ off. However, the transistors do not tend to be identical and, as a result, the circuit tends to flip, even in the absence of an input signal. For example, if the transconductance $\beta_2$ of $T_{11}$ is larger than the transconductance $\beta_1$ of $T_{10}$, the voltage at input port 2 will tend to increase more rapidly than the voltage at port 1, thus turning off transistor $T_{10}$. Similarly, if the threshold voltage $V_{t2}$ of transistor $T_{11}$ is less than the threshold voltage $V_{t1}$ of transistor $T_{10}$, the latter will turn off. In addition, transistor $T_{10}$ will be turned off if $V_{t3}$ is less than $V_{t4}$, of if $\beta_3$ is greater than $\beta_4$.

Figure 4:
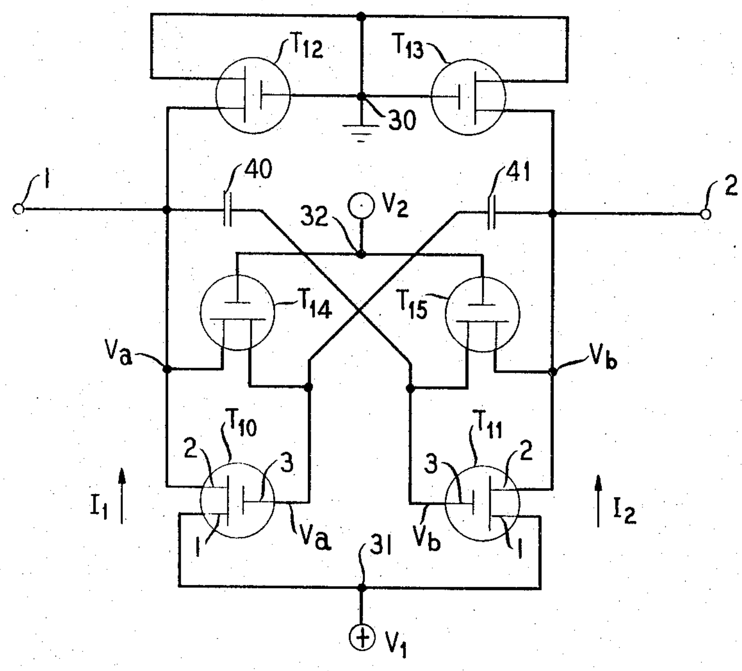
FIG. 4 shows a second embodiment of the present amplifier.

To avoid this tendency due to any or all of the above-described inequalities, the prior art embodiment is modified in the manner shown in FIG. 4. Basically, the circuit of FIG. 4 is the same as FIG. 3 with the addition of a third pair of transistors $T_{14}$ and $T_{15}$, and a pair of coupling capacitors 40 and 41. Transistors $T_{14}$ and $T_{15}$ serve, respectively, to connect the gate electrodes of transistors $T_{10}$ and $T_{11}$ to their respective drain electrodes. The gate electrodes of transistors $T_{14}$ and $T_{15}$ are connected to a common junction 32.

Coupling capacitors 40 and 41 are included in the cross-coupling connections of transistors $T_{10}$ and $T_{11}$ and serve to isolate the drain electrode potential of each transistor from the gate electrode potential of the other.

In operation, a sufficiently high positive voltage $V_1$ is applied to junction 31, and a sufficiently large negative voltage $V_2$ is applied to junction 32 to turn on all of the transistors. In particular, transistors $T_{14}$ and $T_{15}$ provide a short circuit between the drain and gate electrodes of transistors $T_{10}$ and $T_{11}$, respectively. This constitutes the preconditioning period during which a current $I_1$ is caused to flow through transistors $T_{10}$ and $T_{12}$, and a current $I_2$ is caused to flow through transistors $T_{11}$ and $T_{13}$. Because the several transistors have different parameters, $I_1$ and$I_2$ will not necessarily be equal. Similarly, the resulting steady state potentials $V_a$ and $V_b$, established at the drain electrodes of transistors $T_{10}$ and $T_{11}$, will, in general, not be equal. However, whatever these currents and voltages finally become, they represent a steady state condition. In addition, with transistors $T_{14}$ and $T_{15}$ both on, the steady state voltages established at the gate electrodes of transistors $T_{10}$ and $T_{11}$ are also $V_a$ and $V_b$, respectively. and I Having established the above current and voltage conditions for the two transistors $T_{10}$ and $T_{11}$, the voltage applied to junction 32 is increased to a sufficiently high potential to turn off transistors $T_{14}$ and $T_{15}$, thus terminating the preconditioning period and initiating the sensing period. While this opens the gate-drain circuit for each of the two transistors $T_{10}$ and $T_{11}$, nothing else in the circuit is disturbed. The currents $I_1$ and $I_2$ remain as they were at the end of the preconditioning period, as do the voltages at the gate and drain electrodes, and the amplifier remains in a metastable condition. This condition can be upset by the application of unequal signals at input ports 1 and 2. If, for example, a larger positive signal is applied to port 2, the effect will be to turn off transistor $T_{10}$. Conversely, if a larger positive signal is applied to input port 1, the effect will be to turn off transistor $T_{11}$.

It will be noted that in the embodiment of FIG. 4 no attempt is made to equalize the currents in transistors $T_{10}$ and $T_{11}$ as was done in the embodiment of FIG. 1. Instead, a metastable operating condition is established in the transistors. So stabilized, the circuit then responds solely to differences in the magnitude of the applied input signals.

In all cases it is understood that the above described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A signal amplifier comprising:

a first pair of insulated gate field effect transistors having their source electrodes connected to a first common junction;

means, including the source-drain circuit of a second pair of insulated gate field effect transistors, for cross-coupling the gate electrode of each of said first pair of transistors to the drain electrode of the other of said first pair of transistors;

the gate electrodes of said second pair of transistors being connected to a second common junction;

means, including the source-drain circuit of a third pair of insulated gate field effect transistors, for coupling the gate electrodes of said first pair of transistors to a third common junction;

means for connecting the gate electrodes of said third pair of transistors to a fourth common junction;

and signal input terminals located in the gate-drain circuits of said first pair of transistors.

2. The amplifier according to claim 1 including voltage means connected to said four common junctions for simultaneously driving said second pair of transistors off and said third pair of transistors on during a first time period and, thereby, precharging each of the drain electrodes of said first pair of transistors to the threshold voltage for the respective transistors;

and for simultaneously driving said second pair of transistors on and said third pair of transistors off during a second time interval.

3. A signal amplifier comprising:

first and second insulated gate field effect transistors;

a first coupling capacitor connecting the gate electrode of said first transistor to the drain electrode of said second transistor, a second coupling capacitor connecting the gate electrode of said second transistor to the drain electrode of said first transistor, means for connecting the source electrodes of said first and second transistors to a first common junction;

means, including the source-drain circuit of a second pair of insulated gate field effect transistors, for coupling the drain electrodes of said first and second transistors to a second common junction;

means, including the source-drain circuits of a third pair of insulated gate field effect transistors, for coupling the gate electrode of said first transistor to the drain electrode of said first transistor, and for coupling the gate electrode of said second transistor to the drain electrode of said second transistor;

means for connecting the gate electrodes of said third pair of transistors to a third common junction;

and signal input terminals located in the gate-drain circuits of said first and second transistors.

4. The amplifier according to claim 3 including voltage means connected to said three common junctions for simultaneously driving all of said transistors on during a first time period;

and for turning off said third pair of transistors while leaving said other transistors in a on state during a second time period.

* * * * *